United States Patent

Swartz et al.

[11] Patent Number: 5,514,861
[45] Date of Patent: May 7, 1996

[54] COMPUTER AND/OR SCANNER SYSTEM MOUNTED ON A GLOVE

[75] Inventors: Jerome Swartz, Old Field; Simon Bard; Boris Metlitsky, both of Stony Brook, all of N.Y.

[73] Assignee: Symbol Technologies, Inc., Bohemia, N.Y.

[21] Appl. No.: 409,913

[22] Filed: Mar. 23, 1995

Related U.S. Application Data

[63] Continuation of Ser. No. 68,025, May 28, 1993, abandoned, which is a continuation-in-part of Ser. No. 897,837, Jun. 12, 1992, Pat. No. 5,250,790, which is a division of Ser. No. 699,417, May 13, 1991, Pat. No. 5,191,197, which is a continuation-in-part of Ser. No. 193,265, May 11, 1988, Pat. No. 5,144,120, said Ser. No. 68,025, May 28, 1993, abandoned, is a continuation-in-part of Ser. No. 884,734, May 19, 1992, abandoned.

[51] Int. Cl.⁶ ..................................................... G06K 7/10
[52] U.S. Cl. ............................................ 235/472; 235/462
[58] Field of Search ................................... 235/462, 472; 200/DIG. 2

[56] References Cited

U.S. PATENT DOCUMENTS

| | | | |
|---|---|---|---|
| 1,165,970 | 12/1915 | Harris | 200/DIG. 2 |
| 1,197,652 | 9/1916 | Newton | 200/DIG. 2 |
| 3,508,814 | 12/1966 | Aas | 359/199 |
| 3,532,408 | 10/1970 | Dostal | 359/199 |
| 3,544,201 | 1/1968 | Fowler et al. | 359/224 |
| 3,588,359 | 6/1971 | Cribb . | |
| 3,614,677 | 10/1971 | Wilfinger | 333/200 |
| 3,758,199 | 9/1973 | Thaxter | 359/224 |
| 3,794,410 | 2/1974 | Elliott | 359/224 |
| 3,902,783 | 9/1975 | Bodlaj | 359/221 |
| 3,978,318 | 8/1976 | Romeo | 250/566 |
| 3,981,566 | 9/1976 | Frank et al. | 359/224 |
| 4,025,302 | 5/1977 | Lee | 8/488 |
| 4,170,397 | 10/1979 | Botcherby et al. | 359/210 |
| 4,251,798 | 2/1981 | Swartz et al. | 235/462 |
| 4,264,119 | 4/1981 | Minoura et al. | 359/202 |
| 4,286,145 | 8/1981 | Palmer | 235/454 |
| 4,360,798 | 11/1982 | Swartz et al. . | |
| 4,369,361 | 1/1983 | Swartz et al. . | |

(List continued on next page.)

FOREIGN PATENT DOCUMENTS

| | | |
|---|---|---|
| 0264956 | 4/1988 | European Pat. Off. . |
| 0373935A3 | 6/1990 | European Pat. Off. . |
| 0471291A2 | 2/1992 | European Pat. Off. . |
| 1387091 | 3/1975 | Sweden . |

OTHER PUBLICATIONS

A Cahners Publication, Traffic Management for Buyers of Transportation/Services/Equipment, "Wearable Technology for the 1990s", Aug. 1992.

Abstract of Japanese Pat. Apppln. No. 1–306975 (A), Hiroshi Asai, Nippon Riteiru Syst K.K.(1).

Metrologic New Product Bulletin, Jun. 1, 1992.

"Wearable Scanner Raises Productivity" Aug. 1992, p. 24 of Automatic I.D. News.

*Primary Examiner*—Donald T. Hajec
*Assistant Examiner*—Karl D. Frech
*Attorney, Agent, or Firm*—Lowe, Price, LeBlanc & Becker

[57] ABSTRACT

A portable computer and/or scanner system includes a keyboard, another data input device such as an optical scanner, a data processor module and a display. All of these components are arranged on a glove to be worn by a system operator. The system is configured in two housings, the first mounted on a finger brace and the second on a wrist brace, both braces being attached to the glove. The two housings are interconnected by electrical or optical cables. The first housing contains the electro-optical scanner and the second contains a processor module, keyboard and display. The second housing may also contain a transceiver for communication with a host computer, and is positioned on the wrist so that the display is at the top or back of the wrist for easy visualization. The keypad is positioned on the side of the wrist adjacent the thumb so that the operator can use the keypad while watching the display. A push button switch on the finger brace is operated by the thumb to control the scanner.

27 Claims, 4 Drawing Sheets

U.S. PATENT DOCUMENTS

| | | | |
|---|---|---|---|
| 4,387,297 | 6/1983 | Swartz et al. . | |
| 4,409,470 | 10/1983 | Shepard et al. . | |
| 4,436,364 | 3/1984 | Lauer et al. | 359/214 |
| 4,460,120 | 7/1984 | Shepard et al. . | |
| 4,467,196 | 8/1984 | Balliet | 250/227 |
| 4,496,831 | 1/1985 | Swartz et al. . | |
| 4,577,131 | 3/1986 | Soobitsky | 310/328 |
| 4,593,186 | 6/1986 | Swartz et al. . | |
| 4,607,156 | 8/1986 | Koppenaal et al. . | |
| 4,673,803 | 6/1987 | Zerle et al. . | |
| 4,708,420 | 11/1987 | Liddiard | 359/199 |
| 4,714,830 | 12/1987 | Usui | 250/234 |
| 4,719,462 | 1/1988 | Hawkins . | |
| 4,722,625 | 2/1988 | O'Brien | 401/6 |
| 4,732,440 | 3/1988 | Gadhok | 359/214 |
| 4,736,095 | 4/1988 | Shepard et al. . | |
| 4,758,717 | 7/1988 | Shepard et al. . | |
| 4,760,248 | 7/1988 | Swartz et al. . | |
| 4,766,299 | 8/1988 | Tierney | 235/472 |
| 4,775,815 | 10/1988 | Heinz | 310/328 |
| 4,778,233 | 10/1988 | Christenson et al. | 359/214 |
| 4,794,239 | 12/1988 | Allais | 235/462 |
| 4,808,804 | 2/1989 | Krichever et al. . | |
| 4,816,660 | 3/1989 | Swartz et al. . | |
| 4,816,661 | 3/1989 | Krichever et al. . | |
| 4,825,057 | 4/1989 | Swartz et al. | 235/472 |
| 4,825,471 | 5/1989 | Jennings . | |
| 4,827,534 | 5/1989 | Haugen . | |
| 4,835,374 | 5/1989 | Swartz et al. | 235/472 |
| 4,871,904 | 10/1989 | Metlitsky et al. . | |
| 4,876,724 | 10/1989 | Suzuki . | |
| 4,896,026 | 1/1990 | Krichever et al. | 235/472 |
| 4,899,039 | 2/1990 | Taylor et al. . | |
| 4,902,083 | 2/1990 | Wells | 359/214 |
| 4,916,441 | 4/1990 | Gombrich . | |
| 4,919,500 | 4/1990 | Paulsen | 359/214 |
| 5,035,181 | 7/1991 | Jacks et al. | 102/481 |
| 5,105,067 | 4/1992 | Brekkestran et al. . | |
| 5,144,120 | 9/1992 | Krichever et al. . | |
| 5,168,149 | 12/1992 | Dvorkis et al. | 235/472 |
| 5,170,277 | 12/1992 | Bard et al. | 359/210 |
| 5,185,676 | 2/1993 | Nishiberi | 359/202 |
| 5,191,197 | 3/1993 | Metlitsky et al. | 235/472 |
| 5,208,449 | 5/1993 | Eastman et al. | 235/462 |
| 5,210,398 | 5/1993 | Metlitsky | 235/462 |
| 5,250,790 | 10/1993 | Melitsky et al. | 235/462 |
| 5,272,324 | 12/1993 | Blevins | 235/462 |
| 5,276,315 | 1/1994 | Surka | 235/462 |
| 5,304,786 | 4/1994 | Pavlidis et al. | 235/462 |
| 5,305,181 | 4/1994 | Schultz | 361/680 |
| 5,340,972 | 8/1994 | Sandor | 235/472 |

COMPUTER AND/OR SCANNER SYSTEM MOUNTED ON A GLOVE

This application is a continuation of application Ser. No. 08/068,025, filed May 28, 1993, abandoned, which is a continuation-in-part of application Ser. No. 897,837, filed Jun. 12, 1992, which issued as U.S. Pat. No. 5,250,790, which was a division of Ser. No. 699,417, filed May 13, 1991, which issued as U.S. Pat. No. 5,191,197, which was a continuation-in-part of Ser. No. 193,265, filed May 11, 1988, which issued as U.S. Pat. No. 5,144,120.

Ser. No. 068,025 is also a continuation in part of application Ser. No. 884,734, filed May 19, 1992, abandoned and refiled as Ser. No. 08/228,172. This application is related to copending Ser. No. 08/068,024, filed May 28, 1993 and Ser. No. 08/068,026, filed May 28, 1993.

TECHNICAL FIELD

The present invention relates to a portable computer or data input system, typically including an optical scanner, wherein the system is incorporated into a glove worn by the system operator.

BACKGROUND ART

Optical readers, such as bar code readers, are now quite common. Typically, a bar code includes a series of encoded symbols, and each symbol consists of a series of light and dark regions, generally in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. Many applications require the operator to carry the bar code reader about as the operator moves from place to place, and to operate the reader manually to scan codes appearing on different objects. The readers therefore must be easy and convenient to carry and operate.

Many applications additionally require use of a bar code reader with other data input means, such as the incorporation of multiple input elements into a single integrated data input terminal. Such integrated systems typically include a keyboard, for input of alphanumeric data which may or may not be related to bar code data, a central data processor unit having associated RAM and ROM, and a display. Integrated terminals of this type which are small enough to be handheld have been proposed (see e.g. U.S. Pat. Nos. 4,916,441 and 5,144,120). Such units incorporating so many different elements, however, tend to be larger than many dedicated bar code readers and cumbersome to operate as bar code readers, particularly for extended periods. Also, conventional integrated devices often require the operator to hold the device in one hand and operate the keyboard with the other. Such operation requires the use of both hands and does not allow the user to perform other manual tasks at the same time. Further, this operation is awkward, taxing the operators' capabilities and leading more quickly to operator fatigue.

An additional problem occurs when an operator has to make numerous keypad entries while carrying out scanning operations, thus, forcing the operator to temporarily set aside either the scanning device or the keypad while using the other. This is time consuming and can lead to equipment damage if the operator is not dexterous or particularly careful.

These problems, together with problems related to securing and carrying the integrated terminals when not in use, tend to discourage employees from using the data input system, defeating the purpose of the system and particularly the advantages otherwise associated with bar code data entry. Similar problems exist in other types of portable computer or data devices.

From the above discussion of the conventional state of the art, it becomes clear that a need still exists to produce portable computer or data input terminal systems, particularly ones incorporating an optical reader unit, which are convenient to carry and operate.

DISCLOSURE OF THE INVENTION

One object of the present invention is to facilitate easy alternation between scanner data entry and keyboard data entry for a portable computer/scanner system.

Another object of the present invention is to eliminate the hazards associated with switching between different pieces of handheld data input equipment.

Yet another object of the present invention is the elimination of operator fatigue otherwise arising from constantly holding and operating a scanning instrument or a keypad.

Still a further object of the present invention is to increase operator speed for either keyboard entry or scanner entry of data into a portable computer/scanner system.

The present invention includes a data terminal mounted on a glove worn on a system operator's hand. The system is distributed in two housings operatively interconnected and attached to the glove. The first housing includes an electro-optical scanner, and the second includes a processor for handling signals input from the scanner, a keypad and a display. Preferably, interconnections between the scanner and processor, etc. are contained within the glove and the first housing is mounted on a finger brace which fits around the finger. The second housing is also preferably mounted on a wrist brace which fits around the wrist of the glove. Both braces are preferably of a split ring configuration to mount easily to a hand of any size.

The second housing may include a wireless transceiver for use in a communications system having a central processing unit or host computer for receiving data from the portable unit.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 4:
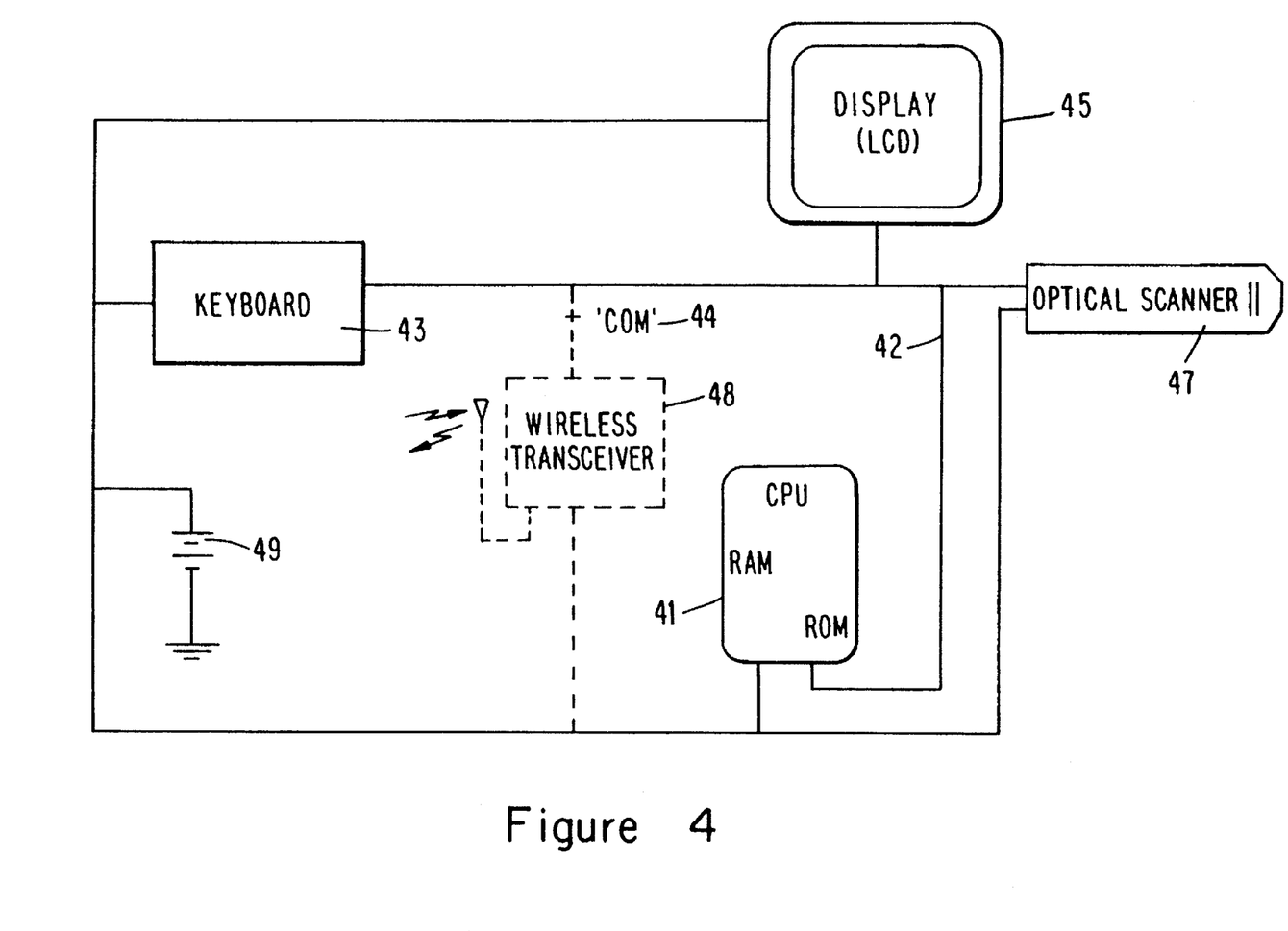
FIG. 4 is a simplified electrical block diagram of the scanner and terminal system components used in the present invention.

FIG. 4 depicts, in much simplified form, the electrical components of a data system including a scanner to input data based on scanned indicia. The system includes a microprocessor based data processor 41, comprising a central processor unit (CPU), a random access memory (RAM) for storing data, and a read only memory (ROM) for storing fixed programming data, etc. As such, the data processor 41 may consist of elements similar to those found in a 16-bit handheld or laptop type personal computer. Cable connections 42 are provided for the various signal communications between the data processor unit 41 and the keyboard 43, the liquid crystal type display (LCD) 45 and the optical scanner 47. A battery system 49 provides power to the data processor 41, the keyboard 43, the liquid crystal type display 45 and the optical indicia scanner 47.

As used in this specification and in the appended claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning a light across it and detecting reflected or scattered light as a representation of variations in light reflectivity at various points of the pattern or information. A bar code is one example of "indicia" which the present invention can scan, preferably by using an optical reading unit in the form of a small moving spot laser beam scanner.

Figures 1A, 1B:
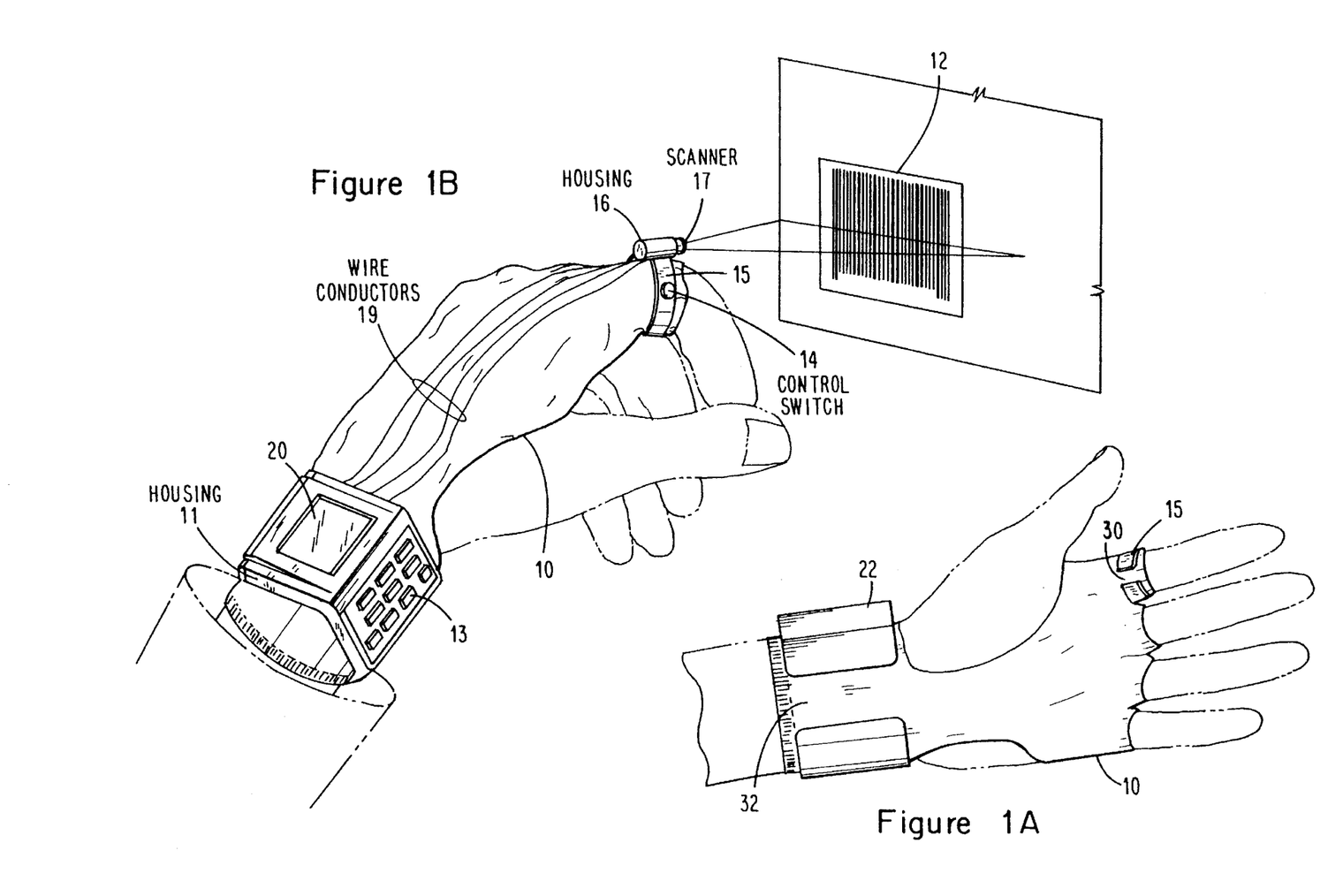
FIG. 1A is a plan view of illustrating the bottom of an operator's hand wearing the present invention.
FIG. 1B is a perspective view of the invention worn on the hand of a human operator positioned to scan indicia.

FIG. 1B illustrates the operating position of a terminal containing the previously described data system. Scanner 17 is a bar code reader positioned to read bar code 12, and is fully contained in a housing 16. However, other types of indicia recognition scanners can be mounted as shown in the housing 16. This housing is secured to the glove 10 and, hence, the user wearing the glove by means of split ring finger brace 15. Preferably, the finger brace 15 is arranged so that it will fit over the index finger of the user. However, other fingers can be used where considered appropriate. A control switch 14 is mounted on the finger brace 15 so that it can be manipulated easily by the thumb of the system operator. The scanner 17, housing 11 and battery system 49 are interconnected by wire conductors 19 arranged in or on the glove 10.

Alternatively, if scanner 17 is a two-dimensional scanner, to accommodate the increased complexity of the scanner, the size of housing 16 must be increased accordingly. In some cases, it may be desirable to use only a light pen in housing 16 that would cooperate with an external light collector (not shown). Under such conditions the conductors 19 extending from housing 16 to housing 11 may comprise optical fibers.

However, when the scanner 17 is entirely self-contained in housing 16, as is preferred, the electrical wire conductors 19 transmit the signals representing the indicia scanned to the processor contained in housing 11. Preferably, the wire conductors 19 are contained within the fabric of the glove 10. However, this is not required, as the wires can be adhered to the outer or interior surface of the glove. The wires 19 are preferably mounted so as to run over the back of the operator's hand since this positioning will impart less strain on the wires. The glove 10 and the wires 19 can be arranged so that the wires are bundled together, or are spread out over a large portion of the glove as shown in FIG. 1B. The wires can also be arranged in a position other than the back of the operator's hand.

The glove 10 need not entirely enclose the operator's hand. As shown in FIG. 1A, the glove does not encompass the operator's thumb; nor is the entirety of any of the operator's fingers covered by the glove. Rather, the glove's finger portions may extend only between the knuckles and first joint of the index finger as shown in FIG. 1A, and may extend similarly for the other fingers. Of course, the glove can entirely encase any or all portions of the operator's hand. In FIGS. 1A and 1B, the glove extends well up the operator's wrist to accommodate a split ring wrist brace 22, to be described later.

The glove is preferably made of a durable light weight material having layers into which the connectors can be placed. Nylon is an ideal material but other fabrics can be used. Under some conditions, leather, cloth or a flexible plastic laminate would be more suitable materials for the glove. However, to achieve the objects of the present invention the glove is preferably arranged to be as light and as comfortable as possible so that the operator is not inclined to remove it.

The flexibility of the glove is especially important in that the index finger of the operator is used to aim the scanner as shown in FIG. 1. By pointing at the appropriate target with the index finger, the operator is able to accurately aim the scanner 17 since the scanner is arranged so that it is always on the back of the index finger.

Figure 3A:
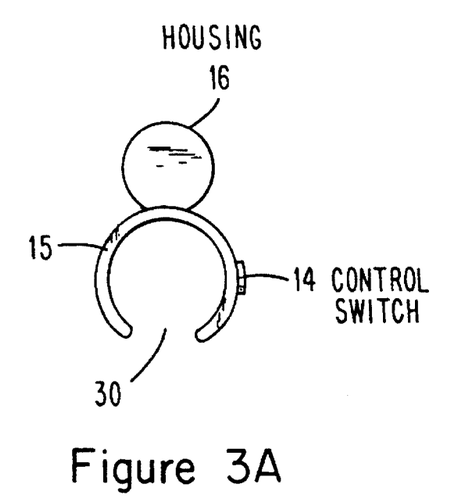
FIGS. 3A and 3B are front and side views of the scanner and its mounting structure.
Figure 3B:
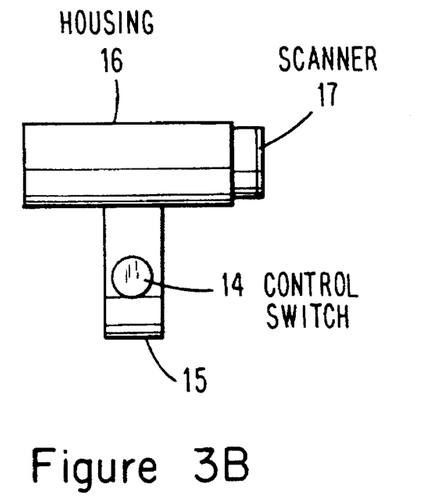

While the finger brace 15, as shown in FIGS. 3A and 3B, must maintain the scanner in a predetermined position on the finger, the material of the finger brace 15 must also be flexible enough to accommodate differences in the finger sizes of different operators. Accommodation for such differences is achieved by gap 30 between the two ends of the ring-like structure of brace 15. The material of the split ring finger brace is preferably a form of plastic which can flex with the movement of the operator's finger while still holding the scanner housing 16 in the proper position. The stability of the scanner position is also maintained by the connection of the split ring finger brace 15 to the fabric of the glove.

For greater flexibility in accommodating differences in operator finger size, the split ring finger brace 15 can be made of a more flexible material such as leather. The ends of the leather ring can be fastened together by means of an appropriate fastening device such as Velcro™. While the overall structure supporting the scanner housing 16 is less stable with this arrangement, operator comfort could be enhanced. Either of these two versions can also accommodate the control switch 14.

In FIG. 1, control switch 14 is depicted as being mounted on the outer side of the index finger opposite the thumb. This arrangement accommodates easy operation by the thumb. However, the finger brace may omit the gap 30 shown in FIG. 3A to constitute a solid ring. In this situation, control switch 14 can be placed on the bottom of the ring opposite the scanner 17, to be operated by the user's thumb.

Control switch 14 preferably is of a push-button type, activating the scanner for only as long as the switch is depressed. Alternatively, control switch 14 can be a slide switch, continuously activating the scanner once the switch has been placed in the proper position.

The battery system 49 of FIG. 4 can be contained in housing 11 of FIG. 1B. This housing also supports a liquid crystal display unit 20, keypad 13 and processor 41 (see FIG. 4). To provide a data link to an external host computer, the data processor 41 will connect to a "COM" port 44 on the exterior of the module housing. The COM port could be a serial or parallel type data port of a standard configuration.

An external connector to the "COM" port (not shown) may take the form of a cable connection to a host computer system for downloading data from the portable system to the host and/or programming the portable system from the host.

Figure 2:
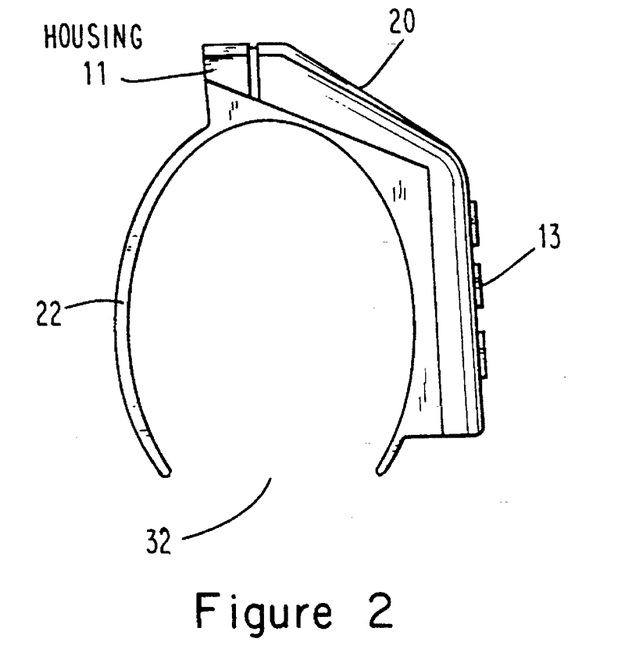
FIG. 2 is a detailed front view of the computer housing and its mounting structure.

As illustrated in FIG. 2, processor housing 11 is supported to the glove 10 by split ring-like wrist brace 22. Since housing 11 extends partially around the brace 22 and hence provides substantial surface area, the necessary contact entryways into the housing 11, such as the "COM" connection and connections to the scanner 17, can be made wherever convenient. Preferably, housing 11 is arranged on the operator's wrist so that the display 20 is on top and the keyboard 13 is on the inner side of the operator's wrist, so that the operator can look down at the display while easily manipulating the keyboard with the opposite hand.

Whereas the keyboard 13 is relatively small compared to hand-held keyboards known in the conventional art, this reduced size is not necessarily a detriment. The keyboard, containing a limited key set, is programmable or trainable by specific operations so that "chording" of key activations to increase the functionality of the limited keyset is permitted. The input keys are typically used for input of actual alphanumeric data. The alphanumeric values assigned to each key, alone or in combination with one or more of the function keys can be programmed into the data processor and the keyboard. For example, repeated activation of one of the four function keys might cycle the keyboard 13 through a numeric mode and one or more alphabetic modes. The numeric mode might emulate the number pad on a computer keyboard or on a calculator, and each alphabetic mode might emulate a segment on an alphabetic keyset. For the operator's convenience, the LCD display might provide an indication of the current keyboard mode.

Similar to finger brace 15 in FIG. 3A, the wrist brace 22 in FIG. 2 must be sufficiently flexible to accommodate differences in wrist size while remaining rigid enough to hold the display and keyboard in the proper position for most efficient use. Flexibility is provided in part by the gap 32 in the ring-like structure. The necessary stability is partially facilitated by the connection of the wrist brace 22 to glove 10. Additional means for stabilization can be provided by the glove itself in the form of a wrist fastener (not shown) which more firmly holds the glove to the wrist of the user. Such fasteners can be of Velcro™ or some other type of fastening that is easily manipulated with only one hand. As with the finger brace 15 (supporting the scanner housing 16), the wrist brace 22 can be made of a variety of materials having the necessary combination of stability and flexibility.

As previously stated, the batteries of battery system 49 can be contained within housing 11. However, the batteries can also be located elsewhere on the body of the user and connected to housing 11 through flexible cables (not shown). Preferably such external batteries would be rechargeable, and could be placed in a container carried in the operator's pocket.

As an alternative to the control switch 14 mounted on the side of finger brace 15, the scanner could be activated from keyboard 13. A pressure switch located in the glove or on the housing 11 could also be used to activate the scanner. Additional alternatives include voice activation and object sensing (i.e., triggering a scanner when an object is near the scanner).

The system can also include a wireless transceiver 48 (e.g. infrared or radio frequency), shown in phantom in FIG. 3, to permit two way data communication between the data processor 41 and an external host computer system while the operator is wearing the glove and moving about to collect bar code data and/or inputting alphanumeric data. In a preferred embodiment using wireless transmission, the wireless transceiver would be a spread spectrum type contained in the wrist-mounted housing. The transceiver module would include shielding to prevent interference and would be in housing 11. This embodiment of the system would also include a flexible RF antenna (not shown) connected to the transceiver. The antenna could be sewn on or woven into the fabric of the back portion of the glove.

A variety of known optical reading devices may serve as the scanner 17. In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. An optical sensor or photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,825,057 and 4,835,374, all of which are owned by the assignee of the instant application, are incorporated herein by reference.

A digitizer processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as auto discrimination. Typically, the various decoder functions are performed by a microprocessor, with associated program memory and random access data memory.

In a typical implementation of the portable data system shown in the drawings, the scanner 17 would include at least the laser light source, the scanning component or other means for producing beam motion, and the photodetector.

The digitizer and/or the microprocessor decoder could also be elements of the scanner contained in housing 16. However, the size of housing 16 may be so increased thereby that mounting it on a finger of the operator may become problematical. In such a case, the scanner would provide digital data signals to the data processor in housing 11 by way of wires 19. Preferably, the data processor performs the decoder function.

Alternatively, the optical reading unit may take the form of a contact or wand type device mounted to an index finger tip of the glove 10. In this case, the operator would turn on the data system, touch the tip of the wand to the surface on which the indicia appears and manually move the tip across the indicia. One or more optical fibers carry the light from the source to a scan head unit which includes optical elements for producing the scanning motion of the beam. Published European Patent Application No. 264,956 discloses one example of such an optical code reader unit using an optical fiber. To adapt this approach to the present invention, the laser diode for producing the scanning beam would be located within the housing 16. An optical fiber would then connect to the processing housing 11. The optical fiber would be sewn into a channel or woven into the fabric of the glove 10.

Figure 5:
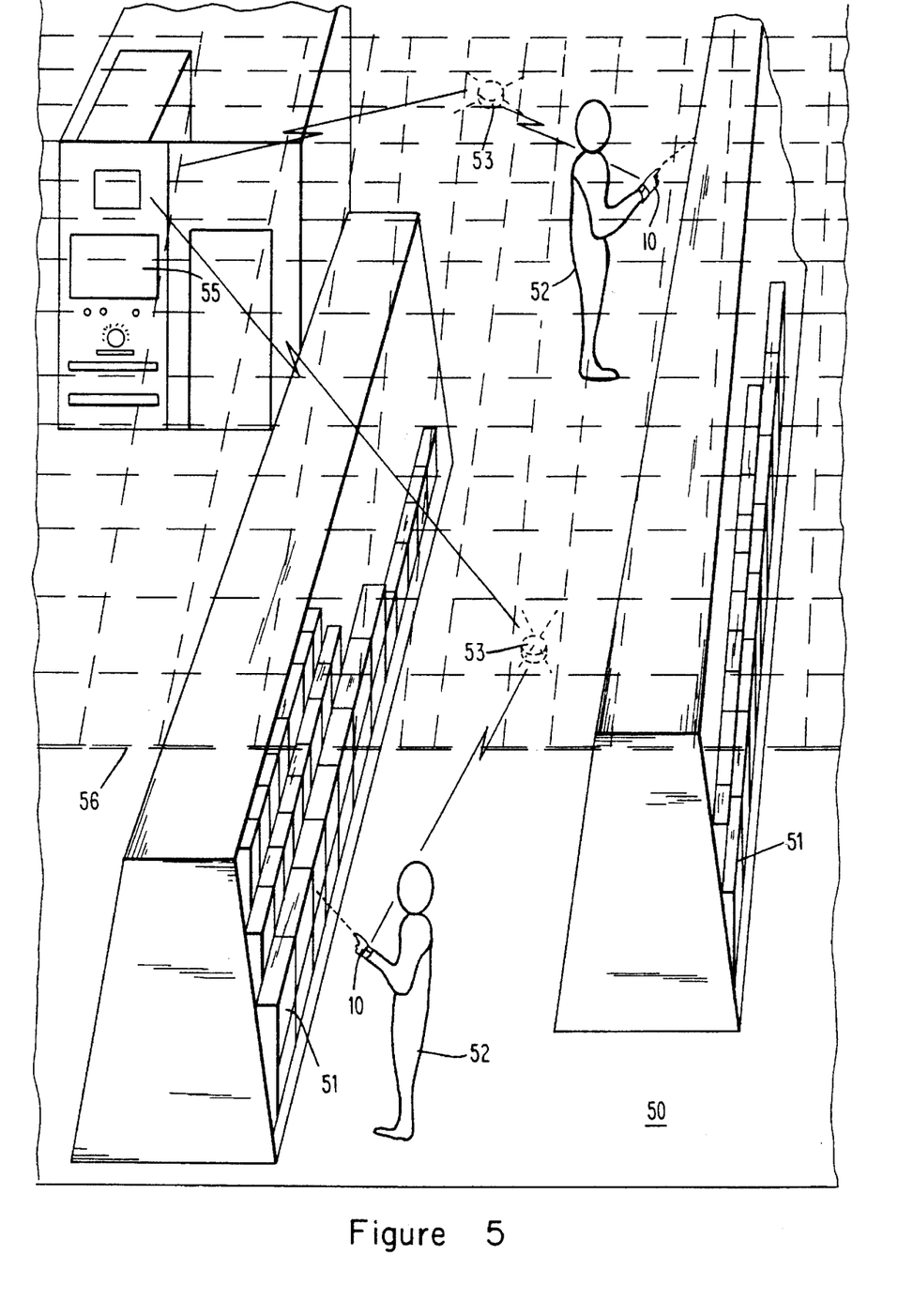
FIG. 5 is a perspective view illustrating an inventory control system using the present invention.

FIG. 5 is a perspective view of an enclosure 50 containing an inventory control system in which the present invention is used. Each of the operators 52 is equipped with glove 10. An operator points the glove-mounted scanner at inventory 51 reading indicia printed on the inventory in order to input data to the system. In the embodiment illustrated by FIG. 5, the terminals mounted on gloves 10 are each equipped with a radio transceiver. These transceivers are used to transmit data from the portable terminal to base stations/data transfer devices 53. Preferably, the base stations 53 are mounted on ceiling 56 to facilitate easy low-power communication between the base stations 53 and the operators 52. The ceiling mounting also facilitates a clear line of communication between the base stations 53 and a host computer 55 to which information is sent for processing. The host processor 55 can also send data to the base stations 53 to be relayed to the portable terminals contained on gloves 10. Alternatively, direct communication between the portable terminal for each operator 52 and the host computer 55 can also be carried out. However, under certain circumstances, the inventory or other obstacles could make complete transmission of data problematical.

The preferred embodiment includes two input devices, preferably a keyboard and an optical scanner. Because of the arrangement and mounting of these two devices, an operator can easily switch between scanned indicia data input and keyboard data input while checking the inputs by means of a display. The input equipment does not have to be carried or even handled. The equipment only has to be operated. Thus, operation is simplified, made much faster and potential damage to equipment is minimized.

Although a number of arrangements of the invention have been mentioned by way of example, it is not intended that the invention be limited thereto. Accordingly, the invention should be considered to include any and all configurations, modifications, variations, combination, or equivalent arrangements falling within the scope of the annexed claims since a variety of additional modifications will be apparent to those skilled in this art.

We claim:

1. A data terminal comprising:

a glove to be worn on a system operator's hand;

a first housing mounted to a single finger portion of said glove by a first mounting;

a second housing mounted to said glove by a second mounting;

said second housing containing;
 (a) means for processing said electrical signal representative of the indicia,
 (b) a keypad input for generating signals representative of alphanumeric data to be input to said processor means, and
 (c) a visual display for displaying said data representative of said indicia and said alphanumeric data;

said first housing containing an actuable electro-optical scanner for projecting a light beam to indicia to be read, for scanning the indicia, and for detecting light of variable intensity that is reflected off the indicia to generate an electrical signal representative of the indicia; and cabling for operatively interconnecting said first and second housings.

2. The data terminal as recited in claim 1, wherein said first mounting comprises a first ring-like brace attached to said glove to fit around a finger of the operator wearing said glove.

3. The data terminal as recited in claim 1, wherein said second mounting comprises a second ring-like brace attached to said glove to fit around the wrist of the operator wearing said glove.

4. The data terminal recited in claim 2, further comprising a switch located on said first ring-like brace for activating said electro-optical scanner.

5. The data terminal as recited in claim 4, wherein said switch is located on a portion of said first ring-like brace facing the operator's thumb.

6. The data terminal as recited in claim 5, wherein said switch comprises a push button switch.

7. The data terminal as recited in claim 3, wherein said second housing is located on a back side of said glove between the user's knuckles and forearm.

8. The data terminal as recited in claim 3, wherein said visual display is located on the glove at the back of the operator's wrist, and said keypad means is located on said glove at an inside portion of the operator's wrist.

9. The data terminal as recited in claim 1, wherein said glove is constituted of an elastomeric material.

10. The data terminal as recited in claim 1, wherein said cabling is arranged within the material of said glove.

11. The data terminal as recited in claim 1, wherein said scanner is arranged such, that said light beam is projected along a finger extending through a first ring-like brace in a direction along which said outstretched finger generally points.

12. The data terminal as recited in claim 11, wherein said first ring-like brace is located to be worn between the knuckles and the first finger joint of the index finger on the operator's hand.

13. The data terminal as recited in claim 1, further comprising a transceiver arranged in said second housing.

14. The data terminal as recited in claim 13, wherein said transceiver operates at radio frequencies.

15. The data terminal as recited in claim 13, wherein said transceiver operates at infrared light frequencies.

16. The data terminal of claim 1, wherein said cabling comprises fiber optic cables.

17. The data terminal of claim 1, wherein said cabling comprises electrical conductors.

18. A data terminal comprising:

a glove to be worn on a system operator's hand;

first and second housings mounted to said glove;

said first housing containing a scanner unit for optically scanning indicia to be read;

said second housing containing a visual display; and electrical conductors interconnecting said first and second housings;

wherein said first housing is mounted to a single finger portion of said glove.

19. The data terminal as recited in claim 18, wherein said second housing further contains means for processing electrical signals received from said scanner unit.

20. The data terminal as recited in claim 19, wherein said second housing further contains a keypad for generating signals representative of alphanumeric data.

21. The data terminal as recited in claim 18, further comprising a first mounting for holding said first housing to a finger of the operator wearing said glove.

22. The data terminal as recited in claim 18, further comprising a second mounting for holding said second housing to a wrist of the operator wearing said glove.

23. A data terminal comprising:

a glove to be worn on a system operator's hand;

first and second housings mounted to said glove;

said first housing containing a scanner unit for optically scanning indicia to be read;

said second housing containing a keypad input for generating signals representative of alphanumeric data; and electrical conductors interconnecting said first and second housings;

wherein said first housing is mounted to a single finger portion of said glove.

24. The data terminal as recited in claim 23, wherein said second housing further contains means for processing electrical signals from said scanner unit.

25. The data terminal as recited in claim 24, wherein said second housing further contains a visual display.

26. The data terminal as recited in claim 23, further comprising a first mounting for fixing said first housing to a finger of the operator wearing said glove.

27. The data terminal as recited in claim 23, further comprising a second mounting for fixing said second housing to the wrist of the operator wearing said glove.

* * * * *